US009664992B2

(12) United States Patent
Yamauchi et al.

(10) Patent No.: US 9,664,992 B2
(45) Date of Patent: May 30, 2017

(54) LIGHTING APPARATUS (71) Applicant: PANASONIC INTELLECTUAL PROPERTY MANAGEMENT CO., LTD., Osaka (JP)

(72) Inventors: Kentaro Yamauchi, Osaka (JP); Atsushi Motoya, Shiga (JP); Ryo Kawamura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 103 days.

(21) Appl. No.: 14/520,750

(22) Filed: Oct. 22, 2014

(65) Prior Publication Data
US 2015/0124224 A1 May 7, 2015

(30) Foreign Application Priority Data
Nov. 5, 2013 (JP) .................. 2013-229821

(51) Int. Cl.
*F21V 33/00* (2006.01)
*G03B 21/20* (2006.01)
*G03B 21/28* (2006.01)
*G03B 21/26* (2006.01)

(52) U.S. Cl.
CPC ......... *G03B 21/28* (2013.01); *G03B 21/2066* (2013.01); *G03B 21/26* (2013.01); *G03B 21/2053* (2013.01)

(58) Field of Classification Search
CPC .... H04N 9/3194; H04N 9/3176; H04N 9/315; H04N 9/3155; H04N 9/3164; G03B 21/208; G03B 21/206; G03B 21/26; G03B 21/13; G03B 21/2013; G03B 21/2053; G03B 21/2093; G02B 6/0078; F21K 9/232; F21S 48/1388; F21V 7/0016
USPC ............................ 353/29; 362/277
See application file for complete search history.

(56) References Cited

U.S. PATENT DOCUMENTS

| 2006/0126028 | A1* | 6/2006 | Ullman | ................. | G03B 21/28 353/69 |
| 2007/0070303 | A1* | 3/2007 | Yonekubo | .............. | G03B 21/16 353/94 |
| 2010/0208211 | A1* | 8/2010 | Paulussen | .............. | G03B 21/13 353/29 |
| 2011/0175934 | A1* | 7/2011 | Paulussen | ............ | G03B 21/005 345/690 |

(Continued)

FOREIGN PATENT DOCUMENTS

| JP | 2006227143 A | * 8/2006 |
| JP | 2009-199854 |   9/2009 |

*Primary Examiner* — Christina Riddle
*Assistant Examiner* — Christopher Lamb, II
(74) *Attorney, Agent, or Firm* — Greenblum & Bernstein, P.L.C.

(57) ABSTRACT

A lighting apparatus is provided capable of emitting light for image projection and light for illumination at the same time. The lighting apparatus includes: an imaging element that converts incident light into light corresponding to an image and outputs the light; a projection lens through which the light is projected onto an object; a first optical path taken by light that is emitted from the projection lens via the imaging element; and a second optical path taken by light that is emitted without passing through the imaging element and the projection lens.

20 Claims, 10 Drawing Sheets (56) References Cited

U.S. PATENT DOCUMENTS

| | | | |
|---|---|---|---|
| 2012/0134133 A1* | 5/2012 | Kang | F21V 3/00 |
| | | | 362/84 |
| 2012/0169953 A1* | 7/2012 | Kataoka | F21S 8/04 |
| | | | 349/36 |
| 2013/0002687 A1* | 1/2013 | Conti | F21K 9/135 |
| | | | 345/501 |
| 2013/0249959 A1* | 9/2013 | Umehara | H04N 7/142 |
| | | | 345/690 |
| 2014/0043544 A1* | 2/2014 | Kasuga | F21V 33/0052 |
| | | | 348/744 |
| 2014/0098303 A1* | 4/2014 | Kasuga | F21K 9/135 |
| | | | 349/5 |
| 2014/0139812 A1* | 5/2014 | Nagatani | H04N 9/3144 |
| | | | 353/52 |
| 2014/0198949 A1* | 7/2014 | Garlington | G03B 21/10 |
| | | | 382/103 |
| 2015/0124223 A1* | 5/2015 | Yamauchi | G03B 21/2093 |
| | | | 353/20 |

\* cited by examiner

LIGHTING APPARATUS

CROSS REFERENCE TO RELATED APPLICATION

This application claims the benefit of priority of Japanese Patent Application No. 2013-229821, filed on Nov. 5, 2013, the entire content of which is hereby incorporated by reference.

TECHNICAL FIELD

The disclosure relates to lighting apparatuses and more particularly to a lighting apparatus capable of emitting light for illumination and light for image projection.

BACKGROUND ART

Projectors, which are image display apparatuses that enlarge and project various images on a screen, have been widely used (for example, see Japanese Unexamined Patent Application Publication No. 2009-199854). Known specific systems of the projectors include projecting an image by causing light from a light source to pass through a transmissive image-projecting device and projecting an image by reflecting light from a light source off a reflective image-projecting device.

SUMMARY

Here, it is conceivable that a lighting apparatus capable of emitting not only light for illumination but also light for image projection at the same time can have wider application.

Thus, the disclosure provides a lighting apparatus that is capable of emitting light for illumination and light for image projection at the same time.

A lighting apparatus according to an aspect of the present invention includes: an imaging element that converts incident light into light corresponding to an image and outputs the light; a projection lens through which the light is projected onto an object; a first optical path taken by the light that is emitted from the projection lens via the imaging element; and a second optical path taken by light that is emitted without passing through the imaging element and the projection lens.

Furthermore, the lighting apparatus may further include a light-blocking member that at least partially separates the first optical path and the second optical path from each other.

Furthermore, the first optical path may be at least partially adjacent to the second optical path without light blocking.

Furthermore, a luminous flux of the light taking the second optical path may be not less than 10% of a luminous flux of the light taking the first optical path.

Furthermore, an optical axis of the light taking the first optical path may be substantially parallel to an optical axis of the light taking the second optical path.

Furthermore, an optical axis of the light taking the first optical path may be substantially identical to an optical axis of the light taking the second optical path.

Furthermore, it may be that an optical system forming the first optical path includes the imaging element and the projection lens, and an optical system forming the second optical path includes either one of (i) at least one of a lens for controlling an intensity distribution of the light taking the second optical path and a reflector for reflecting the light taking the second optical path and (ii) none of the lens and the reflector.

Furthermore, the lighting apparatus may further include a front panel which is light-transmissive and through which at least one of the light taking the first optical path and the light taking the second optical path passes.

Furthermore, it may be that the front panel includes: a first region through which the light taking the first optical path passes; and a second region through which the light taking the second optical path passes, and light diffusion properties of the front panel are higher in the second region than in the first region.

Furthermore, an amount of a light diffusion material contained in the first region may be less than an amount of a light diffusion material contained in the second region.

Furthermore, surface irregularities in the first region may be less than surface irregularities in the second region.

Furthermore, the front panel may have an opening through which the light taking the first optical path passes.

Furthermore, it may be that the lighting apparatus further includes a mirror tube that houses at least part of an optical system forming the first optical path, and the front panel has an opening through which the mirror tube extends.

Furthermore, the lighting apparatus may further include: a casing that houses an optical system forming the first optical path and an optical system forming the second optical path; a mirror tube that is provided inside the casing and houses at least part of the optical system forming the first optical path; and a fixing member that fixes the mirror tube to the casing.

Furthermore, the lighting apparatus may further include: a mirror tube that houses at least part of an optical system forming the first optical path; and a fixing member that fixes the mirror tube to the front panel.

Furthermore, an outer surface of the mirror tube may have light reflective properties.

Furthermore, the lighting apparatus may further include a light source including: a first light source unit which emits the light taking the first optical path; and a second light source unit which emits the light taking the second optical path.

Furthermore, the first light source unit may have a light-emitting area smaller than a light-emitting area of the second light source unit.

Furthermore, the second light source unit may be provided around the first light source unit.

Furthermore, at least one of the following may be true: (1) the first light source unit and the second light source unit are driven by different drive circuits; (2) the light emitted by the first light source unit and the light emitted by the second light source unit have different spectrums; and (3) the light emitted by the first light source unit and the light emitted by the second light source unit have different intensity distributions.

The lighting apparatus according to an aspect of the present invention is capable of emitting light for image projection and light for illumination at the same time.

BRIEF DESCRIPTION OF THE DRAWINGS

The figures depict one or more implementations in accordance with the present teaching, by way of examples only, not by way of limitations. In the figures, like reference numerals refer to the same or similar elements.

DETAILED DESCRIPTION

Hereinafter, lighting apparatuses (a lighting projector) according to embodiments shall be described with reference to the Drawings. It should be noted that each of the subsequently-described embodiments show a specific preferred example of the present invention. Therefore, numerical values, shapes, materials, structural components, the arrangement and connection of the structural components, etc. shown in the following embodiments are mere examples, and are not intended to limit the scope of the present invention. Furthermore, among the structural components in the following embodiments, structural components not recited in any one of the independent claims which indicate the broadest concepts of the present invention are described as arbitrary structural components.

It should be noted that the respective figures are schematic diagrams and are not necessarily precise illustrations. Additionally, components that are essentially the same share the same reference numerals in the respective figures, and there are cases where overlapping explanations thereof are omitted or simplified.

Embodiment 1

Figure 1:
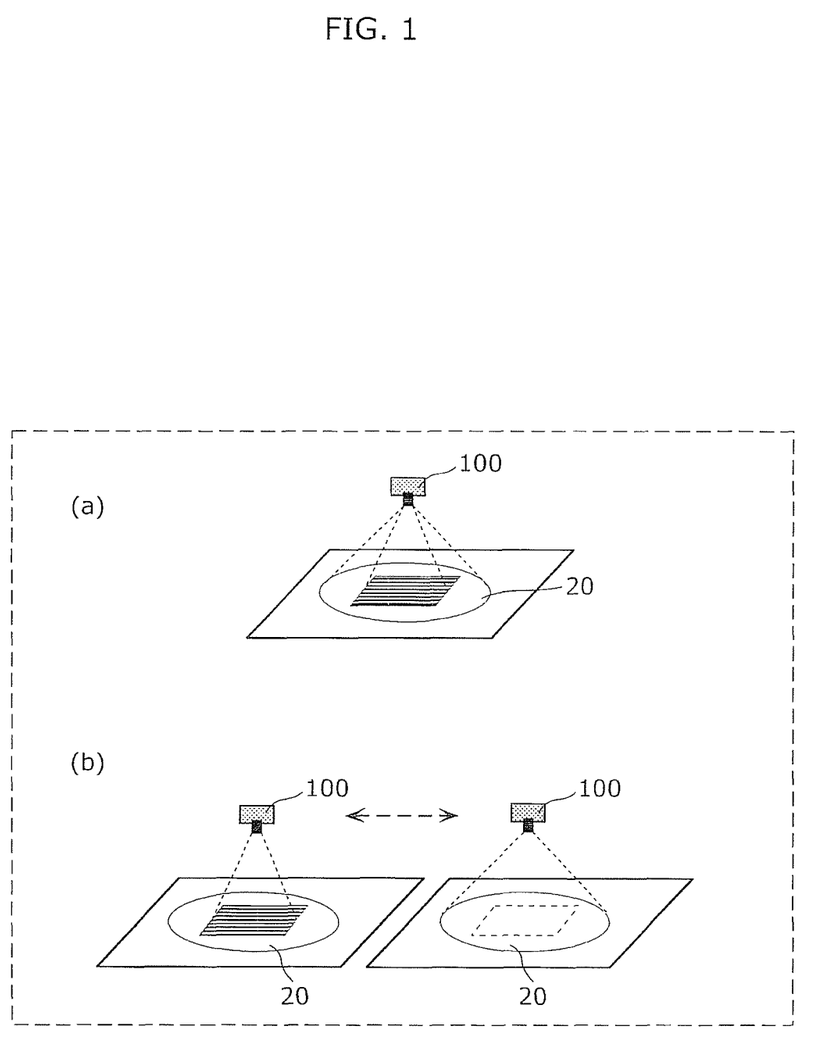
FIG. 1 is an illustration for describing use of a lighting apparatus according to Embodiment 1.

First, use of a lighting apparatus according to Embodiment 1 is described. FIG. 1 is an illustration for describing use of the lighting apparatus according to Embodiment 1.

As illustrated in (a) of FIG. 1, a lighting apparatus 100 according to Embodiment 1 is capable of projecting image-projection light 10 (light for image projection) and illumination light 20 (light for illumination) at the same time. For example, the lighting apparatus 100 is capable of not only projecting the image-projection light 10 onto a surface of a structure (an irradiated surface), but also illuminating its nearby area with the illumination light 20.

Specifically, for example, in the case where the lighting apparatus 100 is installed above a desk, the lighting apparatus 100 is capable of not only illuminating the top of the desk, but also displaying an image on the desk. Furthermore, the lighting apparatus 100 is capable of starting or stopping projecting only the image-projection light 10 as illustrated in (b) of FIG. 1.

As above, the lighting apparatus 100 has not only an illumination function but also a function of presenting an image to a user.

Figure 2:
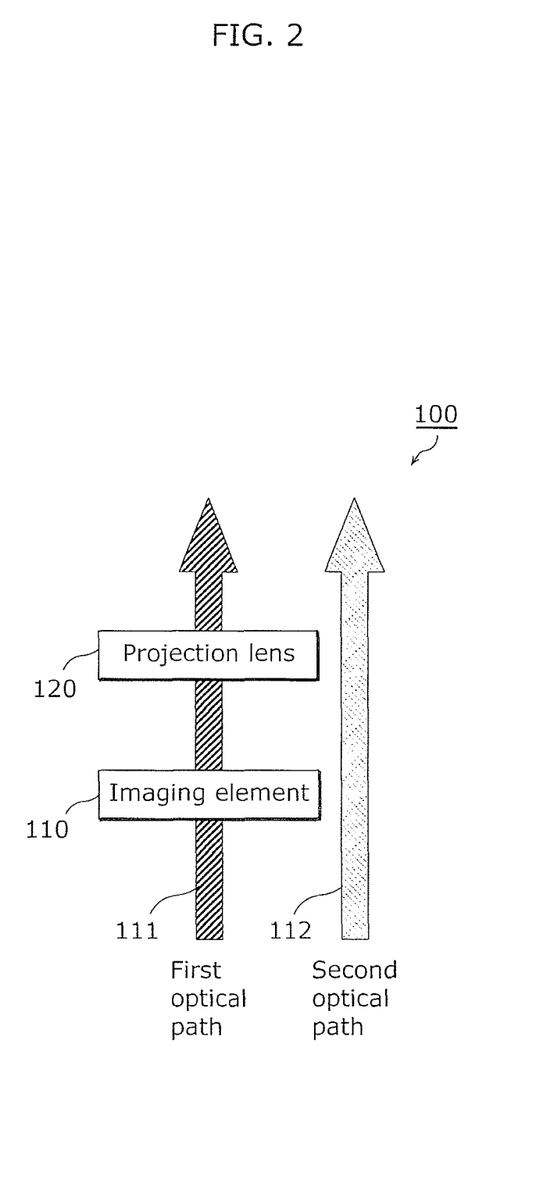
FIG. 2 conceptually illustrates a structure of the lighting apparatus according to Embodiment 1.

Next, a structure of the lighting apparatus 100 is described. FIG. 2 conceptually illustrates a structure of the lighting apparatus 100 according to Embodiment 1.

As illustrated in FIG. 2, the lighting apparatus 100 is characterized by including: a first optical path 111 taken by light that is emitted from a projection lens 120 via an imaging element 110 (an optical system forming the first optical path 111); and a second optical path 112 taken by light that is emitted without passing through the imaging element 110 and the projection lens 120 (an optical system forming the second optical path 112).

Figure 3:
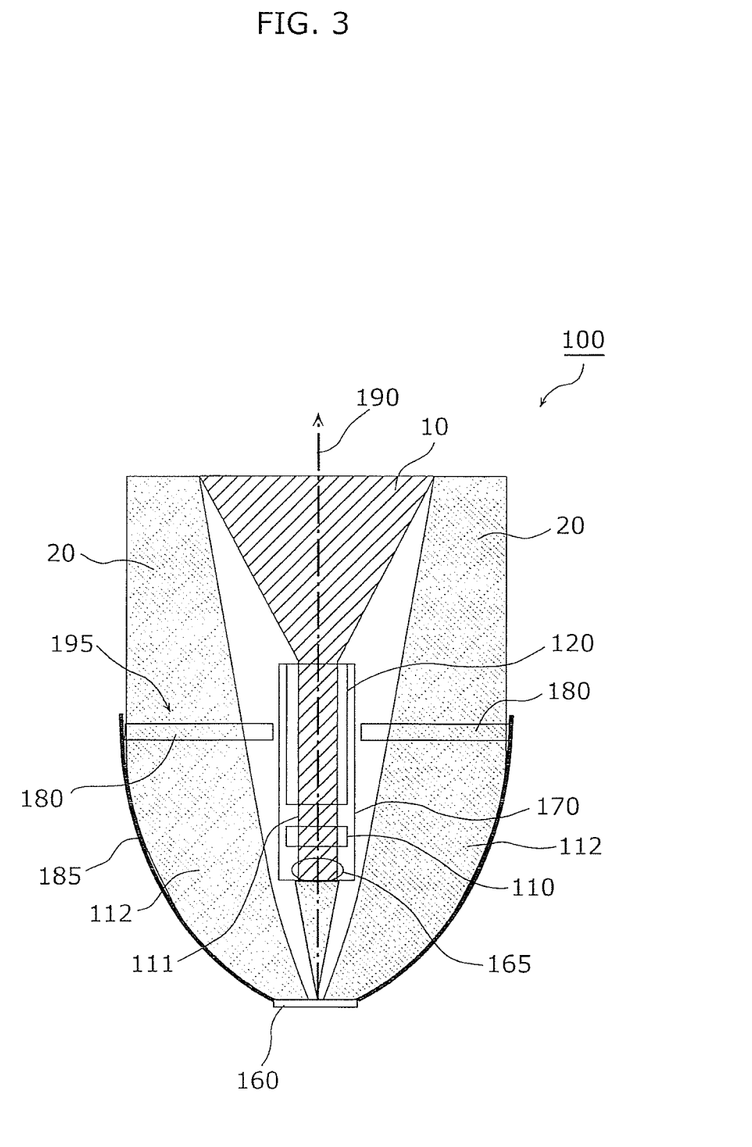
FIG. 3 illustrates an optical system of the lighting apparatus according to Embodiment 1.
Figure 4:
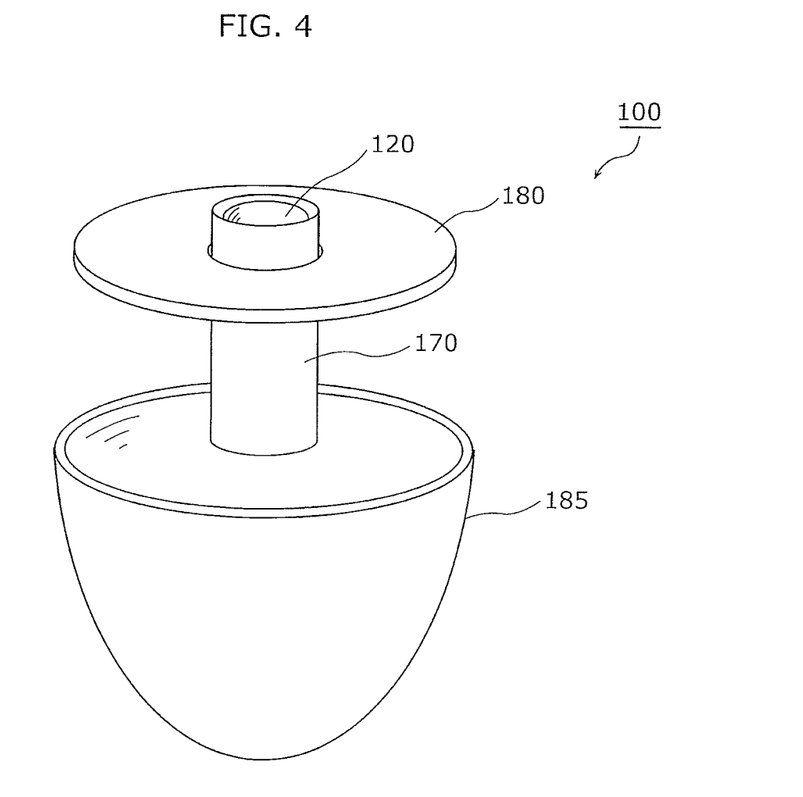
FIG. 4 is a schematic view (an exploded view) illustrating the structure of the lighting apparatus according to Embodiment 1.

The following describes the first optical path 111 and the second optical path 112 in detail. FIG. 3 illustrates the optical system of the lighting apparatus 100 according to Embodiment 1. FIG. 4 is a schematic view (an exploded view) illustrating the structure of the lighting apparatus 100 according to Embodiment 1.

As illustrated in FIG. 3, the lighting apparatus 100 includes a light source 160, a collimating lens 165, the imaging element 110, the projection lens 120, a mirror tube 170, a front panel 180, and a casing 185 (a reflector).

First, an optical system forming the first optical path 111 is described.

The light source 160 is a light source that emits white light. In Embodiment 1, the light source 160 uses a light-emitting diode (LED). It should be noted that the light source 160 may use a discharge lamp or a solid-state light-emitting element such as a semiconductor laser and an organic or inorganic electro luminescence (EL). Light from the light source 160 enters the collimating lens 165 and is aligned therein in parallel.

The imaging element 110 is a substantially planar element that converts the light aligned in parallel by the collimating lens 165 into light corresponding to an image and outputs such light (generates light for image projection). The imaging element 110 is a transmissive liquid-crystal panel in Embodiment 1.

The projection lens 120 is a lens that is for projecting, onto an object, light transmitted by the imaging element 110, and has been conventionally used to form an image on the object with the image-projection light 10.

The mirror tube 170 is a cylindrical member that houses the collimating lens 165, the imaging element 110, and the projection lens 120. The mirror tube 170 may be made of plastic or may be made of metal. Furthermore, the shape of the mirror tube 170 is not limited to a cylindrical shape and may have other shapes including a square tube shape. The mirror tube 170 functions as a light-blocking member that at least partly separates the first optical path 111 and the second optical path 112 from each other.

It should be noted that the outer surface of the mirror tube 170 has light reflective properties. Specifically, the outer surface of the mirror tube 170 is a mirror surface. Here, it may also be that the outer surface of the mirror tube 170 is coated with a material having light reflective properties (such as light diffuser-containing plastic and white pigment). This allows light from the light source 160 to efficiently exit the front panel 180, resulting in a reduced light loss.

Furthermore, using a fixing member, the mirror tube 170 may be fixed to the front panel 180 or may be fixed to the casing 185. In this case, the fixing member is a screw, an adhesive, and so forth. It should be noted that the mirror tube 170 may be directly connected to the front panel 180 or the casing 185 without using the fixing member. For example, the mirror tube 170 fits into an opening at the center of the front panel 180. In this case, a likely specific configuration is such that the mirror tube 170 includes a circumferentially-extending groove into which an end of the front panel 180 that forms the above opening fits.

The collimating lens 165, the imaging element 110, and the projection lens 120 described above are an optical system forming the first optical path 111. In other words, the optical system forming the first optical path 111 includes at least the imaging element 110 and the projection lens 120. The mirror tube 170 houses the optical system forming the first optical path 111.

Here, FIG. 3 illustrates an optical system of the lighting apparatus 100 in simplified form. Therefore, the optical system forming the first optical path 111 may include an optical member used in a common single panel projector (such as an integrator lens, a polarizing beam splitter, an entrance polarizer, and an exit polarizer).

It should be noted that the optical system forming the first optical path 111 does not always need to be housed in the mirror tube 170. Furthermore, it may be that part of the optical system forming the first optical path 111 may be housed in the mirror tube 170.

Next, an optical system forming the second optical path 112 is described.

The casing 185 is a hollow member having a substantially semi-cylindrical shape that houses the optical system forming the first optical path 111 and the optical system forming the second optical path 112. The casing 185 may be made of metal or may be made of plastic. The inner surface of the casing 185 has light reflective properties and functions as a reflector that reflects light from the light source 160 (light taking the second optical path 112). Specifically, the inner surface of the casing 185 is a mirror surface; it may also be that the inner surface of the casing 185 is coated with a material having light reflective properties.

The front panel 180 is a disc-shaped light-transmissive member that transmits outgoing light taking the second optical path 112. The front panel 180 includes a circular opening through which the mirror tube 170 extends. It should be noted that instead of extending through the opening of the front panel 180, the mirror tube 170 may be disposed inside the casing 185. In this case, the opening of the front panel is an opening through which outgoing light taking the first optical path 111 passes.

The inner surface (the reflector) of the casing 185 and the front panel 180 described above are the optical system forming the second optical path 112. In other words, the optical system forming the second optical path 112 includes the inner surface of the casing 185. It should be noted that light taking the second optical path 112 includes light emitted from the light source 160 and directly exiting after being transmitted through the front panel 180 and light emitted from the light source 160 and exiting after being reflected off the inner surface of the casing 185 and transmitted through the front panel 180.

It should be noted that the optical system forming the second optical path 112 may include a lens for general lighting purpose that controls the light intensity distribution. In the case where the optical system forming the second optical path 112 includes such a lens, the inner surface of the casing 185 does not need to have reflective properties. In other words, it is sufficient that the optical system forming the second optical path 112 includes at least one of the lens that controls the intensity distribution of light taking the second optical path 112 and the reflector that reflects light taking the second optical path 112.

Furthermore, it may also be that in the second optical path 112, other optical systems than the light source 160 are not included, and the second optical path 112 is an optical path for light that is emitted from the light source 160 and directly travels out of the lighting apparatus 100.

In the lighting apparatus 100, an optical axis of light taking the first optical path 111 (an optical axis of the optical system forming the first optical path 111) and an optical axis of light taking the second optical path 112 (an optical axis of the optical system forming the second optical path 112) are substantially the same (an optical axis 190). Being substantially the same herein means being the same in a practical sense with misalignment of components in the optical system, a dimensional tolerance of each component, etc., taken into consideration. It should be noted that the optical axis of light taking the first optical path 111 and the optical axis of light taking the second optical path 112 may be substantially parallel.

With the structure described above, the image-projection light 10 is emitted (projected) from the projection lens 120 through the first optical path 111 and, and the illumination light 20 is mitted from the front panel 180 through the second optical path 112. This means that the lighting apparatus 100 is capable of emitting the image-projection light 10 and the illumination light 20 at the same time. Suppose that an opening defined by an end of the casing 185 (an end at which the front panel 180 is provided) is an exit opening 195, then both the image-projection light 10 and the illumination light 20 can be said to exit through the exit opening 195 toward an object. It should be noted that a first region of the object into which the image-projection light 10 is projected and a second region of the object into which the illumination light 20 is projected do not overlap in principle. On the object, basically, the second region is located around the first region.

Here, in the lighting apparatus 100, the luminous flux of light taking the second optical path is not less than 10% of the luminous flux of light taking the second optical path. This means that the lighting apparatus 100 is different from a conventional projector in that light not traveling through the imaging element 110 is intentionally used as light for illumination.

Figure 5:
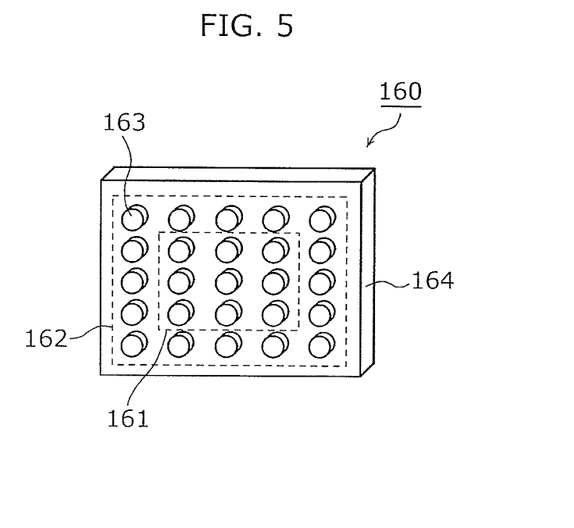
FIG. 5 is an illustration for describing a specific structure of a light source.

Next, a specific example of the light source 160 is described. FIG. 5 is an illustration for describing a specific structure of the light source 160.

As illustrated in FIG. 5, the light source 160 includes a plurality of light-emitting elements 163 arranged in a 5-by-5 matrix on a substrate 164. The light-emitting elements 163 are LEDs, for example. Out of the light-emitting elements 163 arranged in matrix, nine light-emitting elements 163 in a central area of the substrate 164 (the light-emitting elements 163 enclosed by the inner dashed line in FIG. 5) constitute a first light source unit 161. Meanwhile, 16 light-emitting elements 163 in a peripheral area of the substrate 164 (the light-emitting elements 163 enclosed by the inner and outer dashed lines in FIG. 5) constitute a second light source unit 162. In other words, the second light source unit 162 is located around the first light source unit 161. The light-emitting area of the first light source unit 161 (the area covered by nine light-emitting elements 163) is smaller than the light-emitting area of the second light source unit 162 (the area covered by 16 light-emitting elements 163).

As above, the light source 160 includes the first light source unit 161 which emits light taking the first optical path 111 and the second light source unit 162 which emits light taking the second optical path 112.

Here, light emitted by the first light source unit 161 ultimately travels out as the image-projection light 10, and light emitted by the second light source unit 162 ultimately travels out as the illumination light 20. Therefore, it may be that the spectrum of light emitted by the first light source unit 161 is optimized for image projection and the spectrum of light emitted by the second light source unit 162 is optimized for illumination. This means that the spectrum of light emitted by the first light source unit 161 may be different from the spectrum of light emitted by the second light source unit 162.

Furthermore, it may be that the intensity distribution properties of light emitted by the first light source unit 161 are optimized for image projection and the intensity distribution properties of light emitted by the second light source unit 162 are optimized for illumination. This means that the intensity distribution properties of light emitted by the first light source unit 161 may be different from the intensity distribution properties of light emitted by the second light source unit 162.

It should be noted that the structure of the light source 160 is not limited to the above structure and may be any other structures. For example, it is preferable that light passing through the imaging element 110 be parallel light. Therefore, a laser diode may be used as the light-emitting element that constitutes the first light source unit 161. Furthermore, the light source 160 may have a structure in which the first light source unit 161 and the second light source unit 162 are not clearly separated.

Figure 6:
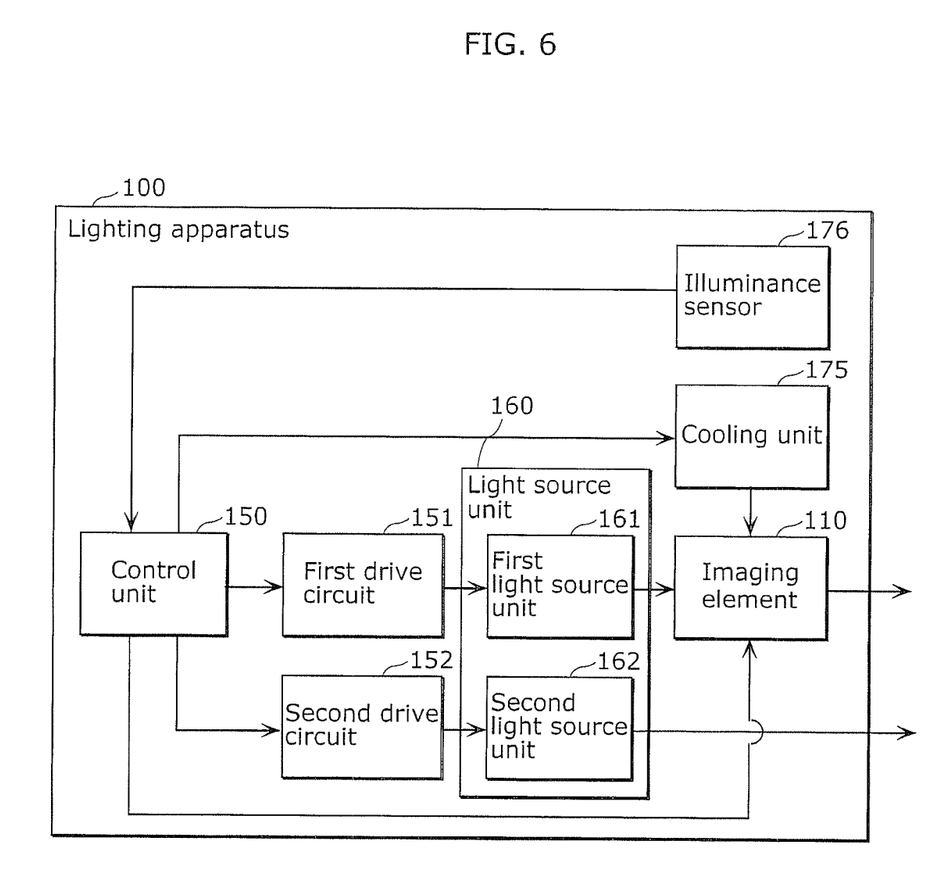
FIG. 6 is a block diagram illustrating a functional structure of a lighting apparatus.

Furthermore, in Embodiment 1, a drive circuit for driving the first light source unit 161 and a drive circuit for driving the second light source unit 162 are provided separately in order that the lighting apparatus 100 starts or stops emitting only the image-projection light 10 as described above with reference to FIG. 1. The following describes a functional structure (a control unit) of the lighting apparatus including such drive circuits. FIG. 6 is a block diagram illustrating the functional structure of the lighting apparatus 100.

As illustrated in FIG. 6, the lighting apparatus 100 includes a control unit 150, a first drive circuit 151, a second drive circuit 152, the light source 160 (the first light source unit 161 and the second light source unit 162), and the imaging element 110.

The control unit 150 controls turning ON and OFF of the light source 160 through the first drive circuit 151 and the second drive circuit 152. Furthermore, the control unit 150 controls the imaging element 110.

Specifically, the control unit 150 is a microcomputer or the like. Here, the control unit 150 may take the form of dedicated hardware or may be implemented by executing a software program suited to the control unit 150. The control unit 150 may be implemented by a program execution unit, such as a CPU or a processor, reading and running the software program recorded on a recording medium, such as a hard disk or a semiconductor memory.

The first drive circuit 151 is a drive circuit that drives (turns ON) the first light source unit 161 under the control of the control unit 150. Likewise, the second drive circuit 152 is a drive circuit that drives (turns ON) the second light source unit 162 under the control of the control unit 150.

Thus, the drive circuit for driving the first light source unit 161 and the drive circuit for driving the second light source unit 162 are provided separately, with the result that the control unit 150 (the lighting apparatus 100) more easily starts or stops the operation to emit only the image-projection light 10 and the operation to emit only the illumination light 20. Furthermore, it also becomes easier for the control unit 150 to control dimming or toning of the image-projection light 10 and the illumination light 20 separately.

For example, the control unit 150 receives, from a remote control light-receiving unit (an input accepting unit) not illustrated in FIG. 6, an instruction entered by a user through a remote control, and starts or stops the operation to emit the image-projection light 10.

It should be noted that as mentioned above, the region into which the image-projection light 10 is projected (the first region of the object) and the region into which the illumination light 20 is projected (the second region of the object) do not overlap in principle. Consequently, stopping emitting (projecting) only the image-projection light 10 results in no light falling only on the region into which the image-projection light 10 had been projected.

In such a case, the control unit 150 may place the imaging element 110 in a totally transmissive state (in which light passes without forming images) and cause the first light source unit 161 to emit light so that pseudo illumination light is projected into the region into which the image-projection light 10 had been projected.

Here, in the lighting apparatus 100, the optical system may have a structure designed so that the first region into which the image-projection light 10 is projected and the second region into which the illumination light 20 is projected overlap each other.

Furthermore, when the image-projection light 10 and the illumination light 20 are projected at the same time, there is a case where a user has a sense of something wrong if there is a large gap between an illuminance of the image-projection light 10 and an illuminance of the illumination light 20. In such a case, the control unit 150 may use an illuminance sensor 176 to determine an illuminance of an object, and control the dimming rate of the first light source unit 161 or the second light source unit 162 through the drive circuit (the first drive circuit 151 and the second drive circuit 152). It should be noted that the illuminance sensor 176 is a sensor that measures an illuminance of an object. The illuminance sensor 176 is, for example, fixed to the casing 185, the mirror tube 170, or the like.

Specifically, the control unit 150 decreases the dimming rate of the first light source unit 161 or increases the dimming rate of the second light source unit 162 in the case where the illuminance of the object in a region into which the image-projection light 10 is projected is higher than the illuminance of the object in a region into which the illumination light 20 is projected, for example. Furthermore, in this case, the control unit 150 is capable of changing the illuminance of the object in the first region (the image-projection light 10) by controlling an amount of light that passes through the imaging element 110.

As above, the control unit 150 is capable of controlling the dimming rate of the first light source unit or the second light source unit or the amount of light that passes through the imaging element 110 based on the measured illuminance so that the illuminance of the object in the first region and the illuminance of the object in the second region approach each other.

It should be noted that the control by the control unit 150 is not limited to the above control when the image-projection light 10 and the illumination light 20 are projected at the same time. It is sufficient that the control by the control unit 150 is such that the image-projection light 10 and the illumination light 20 coexist without causing a sense of something wrong.

For example, it may also be that the lighting apparatus 100 includes a color thermometer and based on a measured color temperature, the control unit 150 performs toning control on the first light source unit 161 or the second light source unit 162 such that the color temperature of the object in the first region and the color temperature of the object in the second region approach each other. Furthermore, it is also possible that, for example, the control unit 150 controls a tint (a color temperature) of the object in the first region (the image-projection light 10) by controlling the imaging element 110. Especially, in the case of what is called a time-division optical system that combines a single panel optical system with a color wheel, or a three-CCD optical system, the control unit 150 is capable of actively adjusting such a tint of the first region (the image-projection light 10).

FIG. 6 includes an illustration of a cooling unit 175 which cools the imaging element 110. The cooling unit 175 is specifically a cooling fan and cools the imaging element 110 by supplying air to the imaging element 110. The control unit 150 uses a temperature sensor not illustrated in FIG. 6 to measure a temperature of the imaging element 110 and when the measured temperature is a predetermined temperature or above, causes the cooling unit 175 to start supplying air for example.

It should be noted that although not illustrated in FIG. 6, the lighting apparatus 100 may include an actuator (a drive unit) that shifts the projection lens 120 inside the mirror tube 170 and an actuator that moves (including rotates) the position of the mirror tube 170. With this, the control unit 150 is capable of changing a projection position for the image-projection light 10 by controlling the above actuators.

The foregoing describes the lighting apparatus 100 according to Embodiment 1. The lighting apparatus 100 includes: the first optical path 111 taken by light that is emitted from the projection lens 120 via the imaging element 110; and the second optical path 112 taken by light that is emitted without passing through the imaging element 110 and the projection lens 120.

With such a structure, the lighting apparatus 100 is capable of projecting the image-projection light 10 and the illumination light 20 at the same time.

Embodiment 2

According to one aspect of the present invention, the lighting apparatus 100 can be provided with an optical system different from the optical system described in Embodiment 1. An example of the lighting apparatus that uses an optical system different from that in Embodiment 1 is described in Embodiment 2 below.

Although the front panel 180 includes the opening in the central area in Embodiment 1, the front panel may be provided with no opening.

Figure 7:
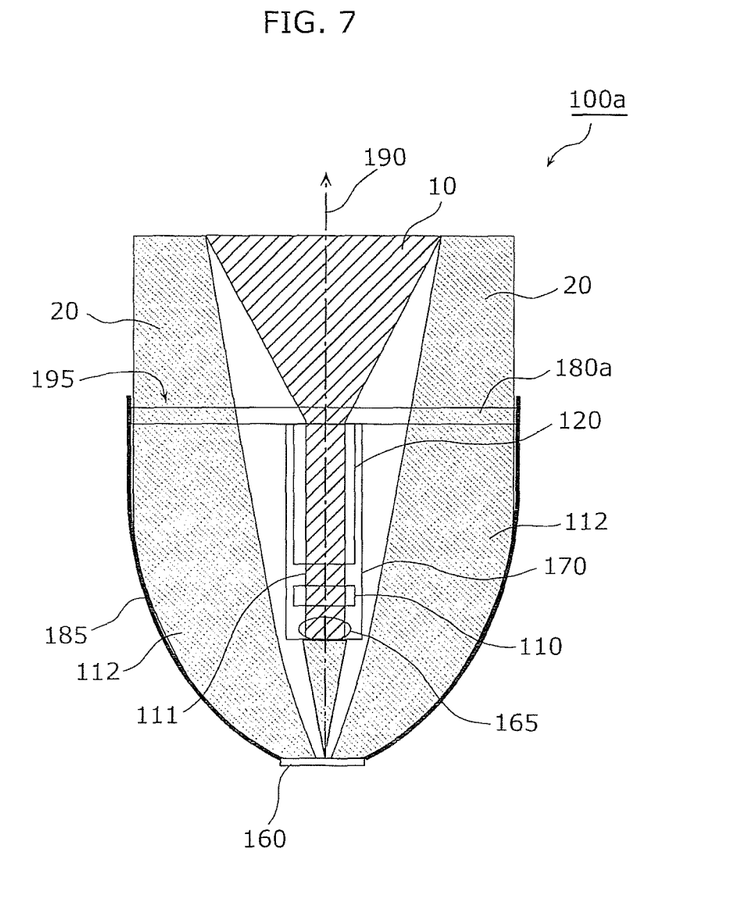
FIG. 7 illustrates an optical system of a lighting apparatus that uses a front panel with no opening.
Figure 8:
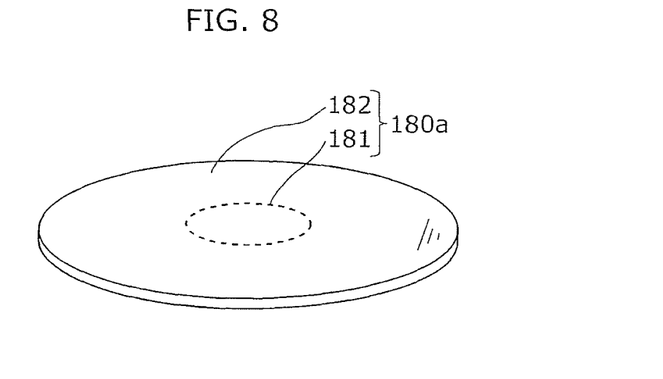
FIG. 8 is an external view of the front panel with no opening.

FIG. 7 illustrates an optical system of a lighting apparatus that uses a front panel with no opening. FIG. 8 is an external view of the front panel with no opening.

A front panel 180a illustrated in FIG. 7 and FIG. 8 is a disc-shaped light-transmissive member and is provided so as to cover the opening of the casing 185. The front panel 180a is provided so as to cover the exit opening of the mirror tube 170. The mirror tube 170 is surrounded by the front panel 180a and the casing 185.

With the above structure, outgoing light taking the first optical path 111 and outgoing light taking the second optical path 112 both pass through the front panel 180a and exit the exit opening 195 of a lighting apparatus 100a as the image-projection light 10 and the illumination light 20, respectively.

Here, as illustrated in FIG. 8, the front panel 180a includes: a circular first region 181 which is located in a central area of the front panel 180a and through which outgoing light taking the first optical path 111 passes; and a ring-shaped second region 182 which surrounds the first region and through which outgoing light taking the second optical path 112 passes. Furthermore, the front panel 180a has higher light diffusion properties in the second region 182 than in the first region 181. This is because it is preferable that the illumination light 20 be diffused more than the image-projection light 10.

The light diffusion properties of the front panel 180a can be adjusted by adjusting the content of a light diffusion material (fine particles), such as silica or calcium carbonate, in a base of the front panel 180a, for example. In this case, the front panel 180a that contains the light diffusion material less in the first region 181 than in the second region 182 will have higher light diffusion properties in the second region 182 than in the first region 181.

Furthermore, it may also be possible to adjust the light diffusion properties of the front panel 180a by providing the front panel 180a with an irregular surface, for example. In this case, intentionally providing the front panel 180a in the second region 182 with an irregular surface results in the front panel 180a having higher light diffusion properties in the second region 182 than in the first region 181. In other words, in the case where the surface irregularities in the first region 181 are less than the surface irregularities in the second region 182, the front panel 180a has higher light diffusion properties in the second region 182 than in the first region 181.

It should be noted that the method of adjusting the light diffusion properties of the front panel 180a is not limited to the above example; it is possible to adjust the light diffusion properties of the front panel 180a by other methods such as application of a light diffusion material to the front panel 180a, printing of a dot pattern on the front panel 180a, and processing of the front panel 180a.

Even with the structure described above, the lighting apparatus 100a is capable of projecting the image-projection light 10 and the illumination light 20 at the same time.

Figure 9A:
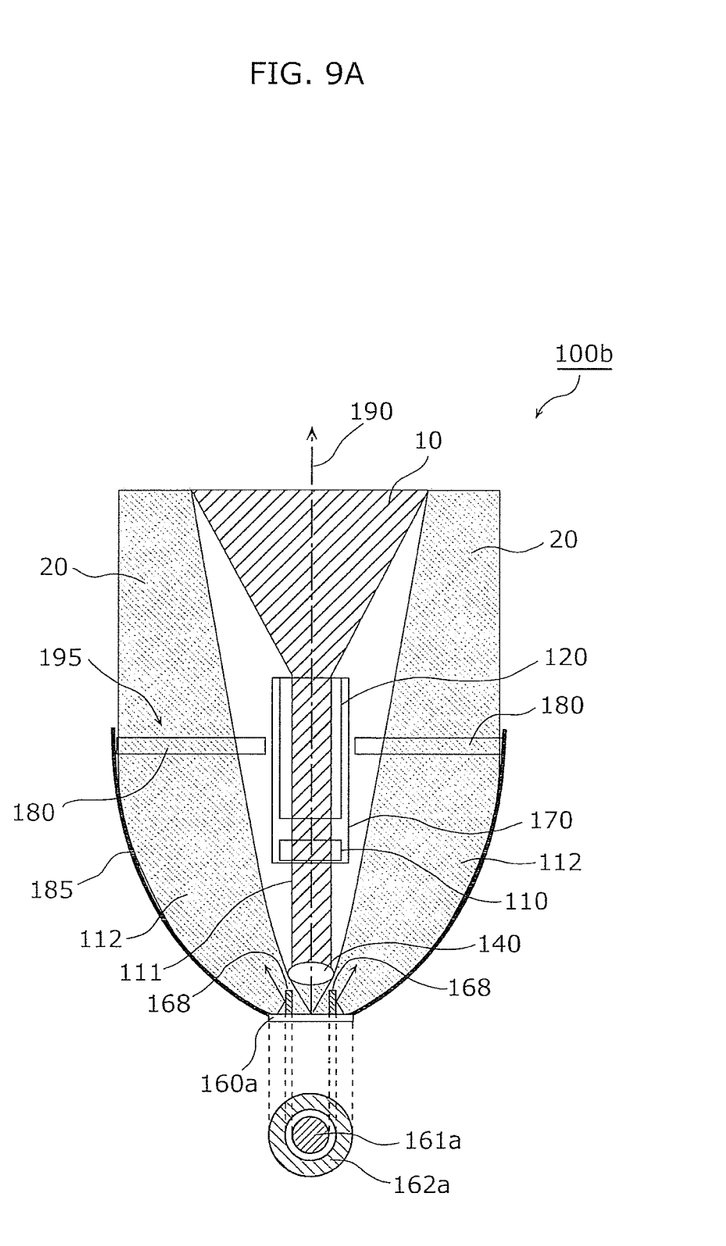
FIG. 9A is a first view illustrating an optical system that separates light emitted from a light source.
Figure 9B:
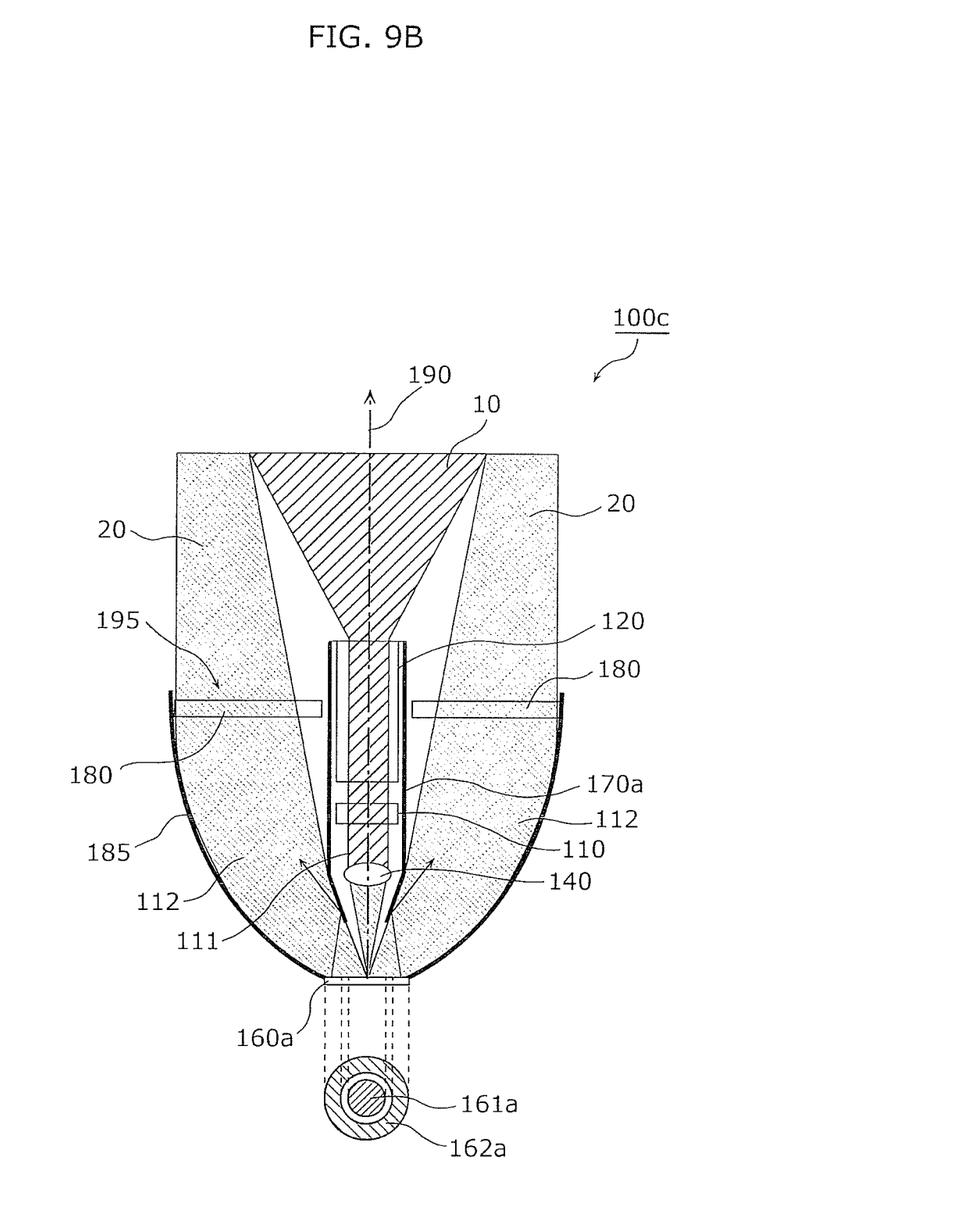
FIG. 9B is a second view illustrating an optical system that separates light emitted from a light source.

Furthermore, the lighting apparatus according to an embodiment of the present invention may include an optical path-separating member which separates (blocks) light emitted from the first light source unit and light emitted from the second light source unit. FIG. 9A and FIG. 9B illustrate an optical system that separates light emitted from a light source.

In the optical system of a lighting apparatus 100b illustrated in FIG. 9A, a cylindrical optical path-separating member 168 is disposed near a light exit surface of a light source 160a. The optical path-separating member 168 separates light emitted from a first light source unit 161a (a circular area at the center of the light source 160a) and light emitted from a second light source unit 162b (a peripheral area of the light source 160a). The optical path-separating member 168 may be of any shape or material as long as it can separate light emitted from the first light source unit 161a and light emitted from the second light source unit 162a.

In the optical system of a lighting apparatus 100c illustrated in FIG. 9B, a mirror tube 170a is longer at an end thereof on the light source 160a side than the mirror tube 170 described in the above embodiment. The end of the mirror tube 170a on the light source 160a side in FIG. 9B (the optical path-separating member) has a cylindrical shape that is reduced in diameter toward the light source 160a (a hollow truncated cone shape). The end of the mirror tube 170a on the light source 160a side separates light emitted from the first light source unit 161a and light emitted from the second light source unit 162a. Here, also in this case, the first optical path 111 is not separated from the second optical path 112 but is adjacent thereto (i.e., integrated therewith) right around the light source 160a.

For example, in the case where a color of light from the first light source unit 161a and a color of light from the second light source unit 162a are different, providing the optical path-separating member described as above produces an effect of reducing the occurrence of light from the first light source unit 161a and light from the second light source unit 162a being mixed and entering the imaging element 110 by causing. In addition, a collimating lens 140 is not capable of aligning light emitted from a position away from a nearby area of the focus of the collimating lens 140. With the above optical path-separating member, a reduced amount of light emitted from a position away from the proximity of the focus of the collimating lens 140 enters the imaging element 110, meaning that the possibility of occurrence of noise caused by such light can be reduced.

Other Embodiments

Although the lighting apparatuses according to Embodiment 1 and Embodiment 2 have been described, the present invention is not limited to the above-described embodiments.

Although the lighting apparatuses in the above-described embodiments use the single panel optical system, it may also be possible to use a three-CCD optical system.

Furthermore, although the above-described embodiments use the transmissive imaging element, it may also be possible to use a reflective imaging element such as a micromirror array or a reflective liquid crystal panel (liquid crystal on silicon abbreviated as LCOS). In this case, an optical system of a projector that uses a reflective imaging element can be applied to the optical system of the lighting apparatus that forms the first optical path 111.

It should be noted that although the above-described embodiments have described the examples in which light from one light source is spatially divided and resultant beams take the first optical path 111 and the second optical path 112, it may also be possible to provide separate light sources; one that emits light taking the first optical path 111 and the other that emits light taking the second optical path 112.

Figure 10:
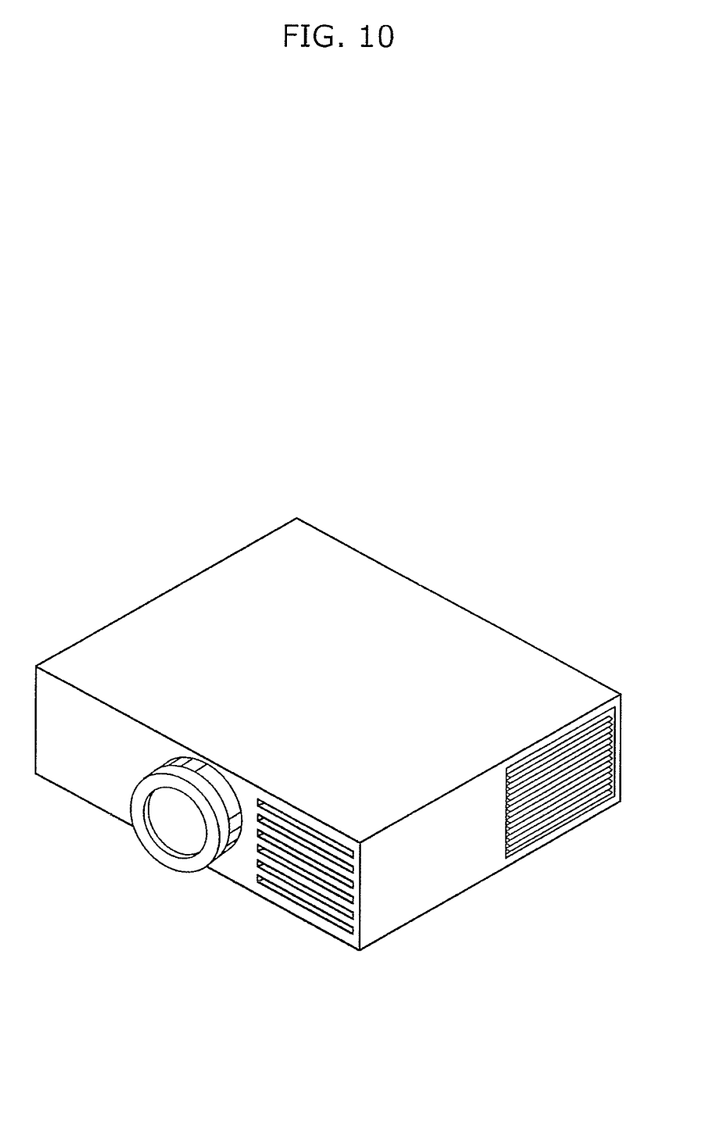
FIG. 10 illustrates an application example of a lighting apparatus.

The lighting apparatuses according to the above-described embodiments can be implemented as a projector illustrated in FIG. 10, for example.

Furthermore, the above-described embodiments have described that the optical system forming the second optical path 112 includes at least one of the lens that controls the intensity distribution of light taking the second optical path 112 and the reflector that reflects light taking the second optical path 112. However, the optical system forming the second optical path 112 may include neither the lens for controlling the light intensity distribution nor the reflector but include the front panel 180 only.

Figure 11:
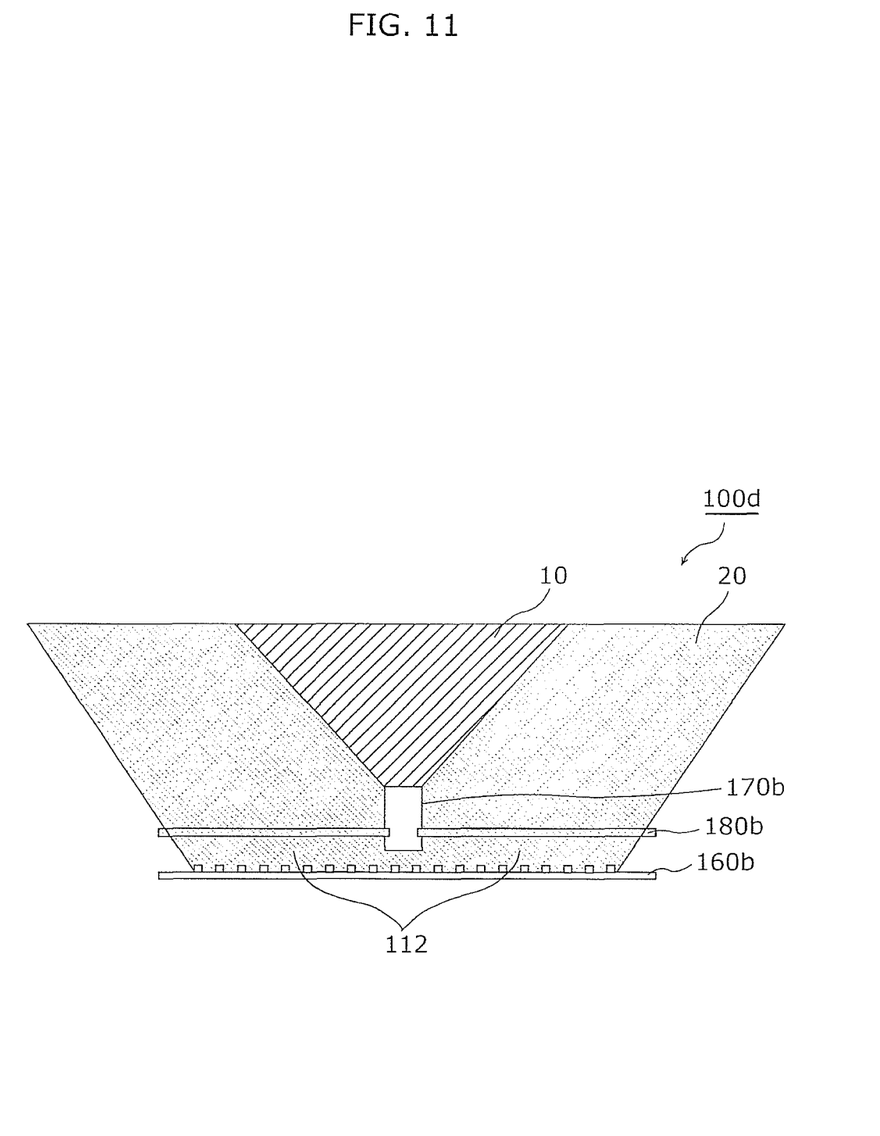
FIG. 11 illustrates an optical system of a lighting apparatus in which an optical system forming a second optical path includes a front panel only.

FIG. 11 is a schematic view illustrating an optical system of a lighting apparatus in which the optical system forming the second optical path 112 includes the front panel 180 only. Here, a mirror tube 170b in FIG. 11 houses therein the optical system described with reference to FIG. 7 that forms the first optical path 111 (the collimating lens 165, the imaging element 110, and the projection lens 120). The mirror tube 170b is inserted into an opening of a front panel 180b. The mirror tube 170b includes a circumferentially-extending groove into which an end of the front panel 180b that forms the opening fits. A light source 160b is a light source in which a plurality of light-emitting elements are mounted on a substrate.

As illustrated in FIG. 11, in a lighting apparatus 100d, light from the light source 160b that takes the second optical path 112 travels out through the front panel 180b only. In other words, the optical system forming the second optical path 112 includes the front panel 180b only. The lighting apparatus 100d with such a structure can be provided as a lighting apparatus that has the shape of, for example, a ceiling light or a base light.

It should be noted that although a region that is irradiated with the image-projection light 10 and a region that is irradiated with the illumination light 20 overlap in principle in the lighting apparatus 100d, it may also be possible to keep the region that is irradiated with the image-projection light 10 and the region that is irradiated with the illumination light 20 from overlapping each other in a structure as that of the lighting apparatus 100d.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. A lighting apparatus comprising:
   an imaging element that converts incident light into light corresponding to an image and outputs the light;
   a projection lens through which the light is projected onto an object;
   a first optical path along which the light that is emitted from the projection lens via the imaging element travels;
   a second optical path along which light that is emitted without passing through the imaging element and the projection lens travels; and
   a front panel which is light-transmissive and includes a first region through which the light traveling along the first optical path passes and a second region through which the light traveling along the second optical path passes, a source of the light travelling along the first optical path and along the second optical path being positioned a same distance from the front panel,
   wherein the first region and the second region are of the same base material, and light diffusion properties of the front panel are higher in the second region than in the first region.

2. The lighting apparatus according to claim 1, further comprising
   a light-blocking member that at least partially separates the first optical path and the second optical path from each other.

3. The lighting apparatus according to claim 1,
   wherein the first optical path is at least partially adjacent to the second optical path without light blocking.

4. The lighting apparatus according to claim 1,
wherein a luminous flux of the light traveling along the second optical path is not less than 10% of a luminous flux of the light traveling along the first optical path.

5. The lighting apparatus according to claim 1,
wherein an optical axis of the light traveling along the first optical path is substantially parallel to an optical axis of the light traveling along the second optical path.

6. The lighting apparatus according to claim 1,
wherein an optical axis of the light traveling along the first optical path is substantially identical to an optical axis of the light traveling along the second optical path.

7. The lighting apparatus according to claim 1,
wherein an optical system forming the first optical path includes the imaging element and the projection lens, and
an optical system forming the second optical path includes either one of (i) at least one of a lens for controlling an intensity distribution of the light taking the second optical path and a reflector for reflecting the light taking the second optical path and (ii) neither one of the lens and the reflector.

8. The lighting apparatus according to claim 1,
wherein an amount of a light diffusion material contained in the first region is less than an amount of a light diffusion material contained in the second region.

9. The lighting apparatus according to claim 1,
wherein surface irregularities in the first region are less than surface irregularities in the second region.

10. The lighting apparatus according to claim 1,
wherein the front panel has an opening through which the light traveling along the first optical path passes.

11. The lighting apparatus according to claim 1, further comprising
a mirror tube that houses at least part of an optical system forming the first optical path,
wherein the front panel has an opening through which the mirror tube extends.

12. The lighting apparatus according to claim 11,
wherein an outer surface of the mirror tube has light reflective properties.

13. The lighting apparatus according to claim 1, further comprising:
a casing that houses an optical system forming the first optical path and an optical system forming the second optical path;
a mirror tube that is provided inside the casing and houses at least part of the optical system forming the first optical path; and
a fixing member that fixes the mirror tube to the casing.

14. The lighting apparatus according to claim 1, further comprising:
a mirror tube that houses at least part of an optical system forming the first optical path; and
a fixing member that fixes the mirror tube to the front panel.

15. The lighting apparatus according to claim 1, further comprising
a light source including: a first light source unit which emits the light traveling along the first optical path; and a second light source unit which emits the light traveling along the second optical path.

16. The lighting apparatus according to claim 15, wherein the first light source unit has a light-emitting area smaller than a light-emitting area of the second light source unit.

17. The lighting apparatus according to claim 15, wherein the second light source unit is provided around the first light source unit.

18. The lighting apparatus according to claim 15,
wherein at least one of the following is true: (1) the first light source unit and the second light source unit are driven by different drive circuits; (2) the light emitted by the first light source unit and the light emitted by the second light source unit have different spectrums; and (3) the light emitted by the first light source unit and the light emitted by the second light source unit have different intensity distributions.

19. The lighting apparatus according to claim 1, further comprising
a reflector that reflects, toward the object, the light traveling along the second optical path.

20. The lighting apparatus according to claim 19,
wherein the second optical path surrounds the first optical path, and
the reflector surrounds the second optical path and curves to reflect, toward the object, the light traveling along the second optical path.

* * * * *